Figure 1:
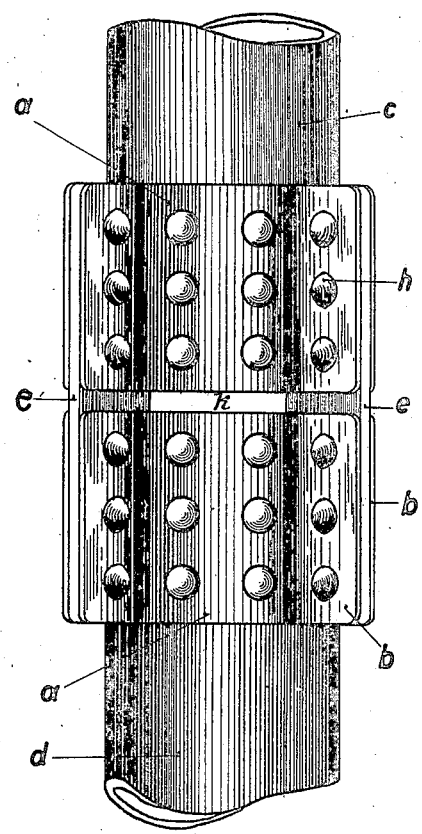

March 11, 1924.  
J. SCHUETTE  
PIPE JOINT  
Filed Feb. 20, 1922  
1,486,549

Inventor;
Johann Schuette,
By Blackwood Bros.,
Attorneys.

Patented Mar. 11, 1924.

1,486,549

UNITED STATES PATENT OFFICE.

JOHANN SCHUETTE, OF ZEESEN-KONIGS WUSTERHAUSEN, NEAR BERLIN, GERMANY, ASSIGNOR, BY MESNE ASSIGNMENTS, TO AMERICAN INVESTIGATION CORPORATION, OF NEW YORK, N. Y., A CORPORATION OF MARYLAND.

PIPE JOINT.

Application filed February 20, 1922. Serial No. 537,667.

*To all whom it may concern:*

Be it known that I, JOHANN SCHUETTE, a citizen of the German Republic, residing at Zeesen-Konigs Wusterhausen, near Berlin, Germany, have invented certain new and useful Improvements in Pipe Joints, of which the following is a specification.

This invention relates to improved pipe joints, such as are employed in connecting the butt-ends of pipes for use, for example, in the construction of frames, skeletons and similar structures, in particular of skeletons or frame works for airships. In structures of the kind the pipes must be of considerable length and often require to be composed of single sections which are to be connected with each other by means of rivets, it being objectionable, for the particular purposes, to connect such pipe sections by welding or by means of threaded coupling sleeves or the like.

It has also been suggested to unite the butt-ends of two pipe sections by means of an inner or an outer sleeve and to connect the sleeve with the pipe ends by riveting. Furthermore it has been proposed to employ for the purpose a pair of half-sleeves or shells. But in all these cases the riveting operation cannot be readily carried out and auxiliary holes in the wall of the pipes are required to get access to the rivet heads during riveting. Moreover the application of coupling sleeves of the stated kind is not possible or only possible with great difficulties in cases where a pipe section is to be inserted between the ends of two stationary pipes or pipe sections.

All these difficulties are overcome by the present invention and at the same time a further advantage is ensured by the new joint residing in that the two pipes or pipe sections to be coupled assume a correct conaxial position towards each other by themselves during the connecting operation and differences or inaccuracies in the length of the sections are equalized by the joint or do not interfere with the proper application of the joint. A further object of the invention is to provide a readily applicable, strong and reliable connection between the pipes or pipe sections to be coupled together.

With the above object in view the improved new joint comprises two sleeves each consisting of a plurality of hollow cylindrical divisions or segments with laterally upturned edges, which when composed to form the sleeve as a whole leave a free space or gap between each pair of the adjacent upturned edges for the insertion of a joint plate or stay. The thus formed sleeve is of a diameter to exactly fit to the end of the pipe or pipe section and the single divisions or segments are connected with the pipe or pipe section end by means of rivets leaving the gaps between them free for the subsequent insertion of the said joint plates.

A divided or segmental sleeve of the stated kind is attached by rivets, as described, to each of the two abutting ends of the two pipes or pipe sections to be coupled together. The joint plates commonly are of at least double the length of the sleeve so that, when inserted in two alined gaps of the sleeves of the two abutting pipe ends, they snugly fill out the two alined gaps and are ready for connection with the upturned or radial edges of the sleeve segments by means of rivets or the like. To this end both the radial edges or flanges of the sleeve and the joint plates are provided with registering holes for the reception of the rivets.

The joint plates preferably are of rectangular shape with straight parallel end faces or edges. The median portion of the plate, however, may be enlarged to better resist strains and stresses. Such enlargement is preferably provided on the inner side or edge and, in this case, the ends of the pipes or pipe sections are slotted for the reception of the enlargements of the joint plates.

In order that the said invention may be clearly understood and readily carried into effect, it will now be described more fully with reference to the accompanying drawings, in which:—

Figure 3:
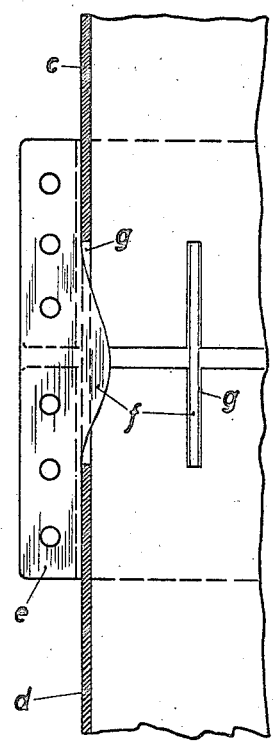
Figure 2:
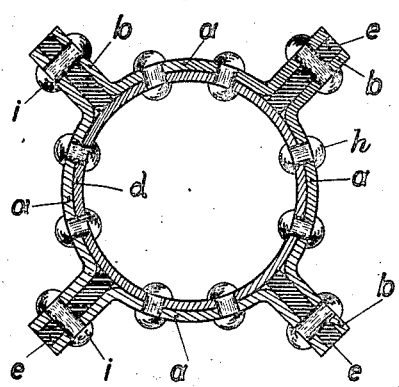
Figure 4:
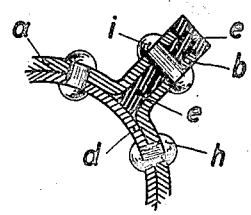

Figure 1 is an elevation of one form of the improved pipe joint with the two pipes broken off, Figure 2 is a sectional plan view thereof, Figure 3 is a sectional elevation of a modification partly broken off and Figure 4 is a sectional view of a further modification.

In the embodiment of the invention shown in Figures 1 and 2 the sleeve comprises four divisions or segments $a$ with upturned longitudinal edges or flanges b. A sleeve of this kind is rigidly connected by means of rivets h with the end of the pipe or pipe section c and a second sleeve of the same kind is similarly connected with the end of the other pipe or pipe section d to be coupled with the former. In the gaps between the adjoining radial flanges b of the segments a the joint plates e are embedded in a manner that each of the four plates e fills out two alined gaps of the two sleeves. The radial flanges b and the plate e therebetween are connected with each other by means of rivets i.

The employment of two sleeves comprising each three, four or still more divisions or segments of a hollow cylinder, in connection with interposed stays or joint plates to unite the two sleeves when rigidly attached to the abutting ends of two pipes or pipe sections ensures a perfect axial alignment of the pipes or pipe sections in their coupled state. It is, however, not necessary that the two pipes or pipe sections in the properly coupled state are in direct touch with each other, a clearance k may be left between the end edges of the two pipes c and d, as clearly shown in Figure 1, without thereby impairing the rigidity of the joint. Such clearance rather is an advantage of the new pipe joint since it accommodates for inaccuracies in dimensional regards. The number of the divisions or segments a and joint plates e may vary, as hereinbefore stated, depending upon the diameter and the thickness of the walls of the pipes to be coupled. Instead of flat plates e, as shown in Figures 1 and 2, plates of T-shaped section, as illustrated in Figure 4, or of any other suitable shape may be employed. In the modification shown in Figure 4 the head e of the plate e overlies the outer edges of the radial flanges b, thus adding to the rigidity of the whole structure.

In the embodiment of the invention shown in Figure 3 the median part of the inner edge of the joint plates e is enlarged and the enlargements f project into longitudinal slots g provided for the purpose in the ends of the pipes c and d. In this way the rigidity of the joint is considerably increased.

Having now particularly described and ascertained the nature of the invention and in what manner the same is to be performed, what is claimed is:

1. A pipe joint comprising a divided or segmental sleeve rigidly connected with the end of a pipe, a second similar sleeve likewise connected with the end of a pipe to be coupled with the first pipe, upturned longitudinal edges or flanges radially projecting from the divisions or segments constituting said sleeves and forming radial gaps between said segments, and joint plates immovably secured within said gaps against relative movement, each one in rigid connection with the alined flanges on both sides of a gap.

2. A pipe joint comprising a divided or segmental sleeve rigidly connected with the end of a pipe, a second similar sleeve likewise connected with the end of a pipe to be coupled with the first pipe, longitudinal edges or flanges projecting radially from the divisions or segments constituting said sleeves and forming radial gaps between said segments, and joint plates each one in rigid connection with the alined flanges on both sides of a gap and each being of T-shaped cross section with the head overlying the outer edges of said radial flanges.

3. A pipe joint comprising a divided or segmental sleeve rigidly connected with the end of a pipe, a second similar sleeve likewise connected with the end of a pipe to be coupled with the first pipe, upturned longitudinal edges or flanges projecting radially from the divisions or segments constituting said sleeves and forming radial gaps between said segments, joint plates each one in rigid connection with the alined flanges on both sides of a gap and each having a median enlargement and longitudinal slots in the ends of the two pipes to be coupled, corresponding to and for the reception of said enlargements.

4. A pipe joint comprising a divided or segmental sleeve rigidly connected with the end of a pipe, a second similar sleeve likewise connected with the end of a pipe to be coupled with the first pipe, upturned longitudinal edges or flanges extending radially from the divisions or segments constituting said sleeves and forming radial gaps between said segments, joint plates each one in rigid connection with the alined flanges on both sides of a gap and each being of T-shaped cross section and having a median enlargement, and longitudinal slots in the ends of the two pipes to be coupled, corresponding to and for the reception of said enlargements.

5. A pipe joint comprising divided or segmental sleeves each secured to the adjacent ends of the sections of a pipe, flanges projecting from each of said segmental sleeves, plates between said flanges and spacing them apart and means for rigidly connecting said flanges and plates.

6. A pipe joint comprising divided or segmental sleeves each secured to the adjacent ends of the sections of a pipe, flanges projecting from each of said segmental sleeves, plates immovably secured between said flanges against relative movement and spacing said flanges apart.

7. A pipe joint comprising divided or segmental sleeves each secured to the adjacent ends of the sections of a pipe, flanges projecting from each of said segmental sleeves with flat portions and plates with flat portions in contact with flat portions of the said flanges and means for rigidly connecting said flanges and plates.

8. A pipe joint comprising divided or segmental sleeves each secured to the adjacent ends of the sections of a pipe, slots in each section of said pipe, flanges projecting from each of said segmental sleeves, plates between said flanges and spacing them apart provided with means engaging said slots and means for rigidly connecting said flanges and plates.

9. A pipe joint comprising divided or segmental sleeves each secured to the adjacent ends of the sections of a pipe, slots in each section of said pipe, flanges projecting from said segmental sleeves, plates between said flanges spacing them apart provided with projections engaging said slots and means for rigidly connecting said flanges and plates.

10. A pipe joint comprising divided or segmental sleeves each secured to the adjacent ends of the sections of a pipe, elongated slots in each section of said pipe, flanges projecting from each of said segmental sleeves, plates between said flanges and spacing them apart provided with elongated projections engaging said slots and means for rigidly connecting said flanges and plates.

11. A pipe joint comprising divided or segmental sleeves each secured to the adjacent ends of the sections of a pipe, slots in the adjacent edges of each section of said pipe, flanges projecting from each of said segmental sleeves, plates between said flanges and spacing them apart and provided with projections each of which engages a slot in the adjacent edge of each of the pipe sections and means for rigidly connecting said flanges and plates.

12. A pipe joint comprising divided or segmental sleeves each secured to the adjacent ends of the sections of a pipe, elongated slots in the adjacent edges of each section of said pipe, flanges projecting from each of said segmental sleeves, plates between said flanges and spacing them apart and provided with elongated curved projections each of which engages a slot in the adjacent edge of each of the pipe sections and means for rigidly connecting said flanges and plates.

13. A pipe joint comprising a plurality of divided or segmental sleeves each rigidly or immovably secured to the adjacent ends of the sections of a pipe, slots in each section of said pipe flanges projecting from each of said segmental sleeves, plates between flanges and spacing them apart provided with projections engaging the slot in the adjacent edge of the pipe sections and means for rigidly connecting said flanges and plates.

14. A pipe joint comprising a plurality of divided or segmental sleeves each rigidly or immovably secured to the adjacent ends of the sections of a pipe, a plurality of slots in each section of said pipe, flanges projecting from each of said segmental sleeves having flat face portions, plates having flat faces between said flanges and spacing them apart provided with projections engaging the slots in the sections of said pipe and means for rigidly connecting said flanges and pipes.

15. A pipe joint comprising a plurality of divided or segmental sleeves each rigidly or immovably secured to the adjacent ends of the sections of a pipe, a plurality of slots in each section of said pipe, the ends of said slots which terminate at the inner ends of said pipes being open, flanges projecting from each of said segmental sleeves, plates between said flanges and spacing them apart provided with projections engaging the said slots and means for rigidly connecting said flanges and pipes.

In testimony whereof I affix my signature.

JOHANN SCHUETTE.